(12) United States Patent
Vishnubhotla

(10) Patent No.: US 6,820,089 B2
(45) Date of Patent: Nov. 16, 2004

(54) METHOD AND SYSTEM FOR SIMPLIFYING THE USE OF DATA MINING IN DOMAIN-SPECIFIC ANALYTIC APPLICATIONS BY PACKAGING PREDEFINED DATA MINING MODELS

(75) Inventor: Prasad R. Vishnubhotla, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 09/826,662

(22) Filed: Apr. 5, 2001

(65) Prior Publication Data

US 2002/0147599 A1 Oct. 10, 2002

(51) Int. Cl.[7] ............................................. G06F 17/30
(52) U.S. Cl. .............................. 707/101; 707/6; 707/3; 706/15
(58) Field of Search ........................ 707/3–6, 100–101; 706/15–16

(56) References Cited

U.S. PATENT DOCUMENTS

| | | | | |
|---|---|---|---|---|
| 5,970,482 | A | * 10/1999 | Pham et al. | 706/16 |
| 6,108,004 | A | * 8/2000 | Medl | 345/804 |
| 6,240,411 | B1 | * 5/2001 | Thearling | 707/5 |
| 6,324,533 | B1 | * 11/2001 | Agrawal et al. | 707/3 |
| 2002/0016935 | A1 | * 2/2002 | Bergsten et al. | 714/20 |
| 2002/0078039 | A1 | * 6/2002 | Cereghini et al. | 707/4 |
| 2002/0083067 | A1 | * 6/2002 | Tamayo et al. | 707/100 |

OTHER PUBLICATIONS

John, George, "Enhancements to the Data Mining Process", a Dissertation for the degree of Doctor of Philosophy, Standford University, USA, Mar. 1997, 194 pages.*

* cited by examiner

Primary Examiner—Srirama Channavajjala
Assistant Examiner—Khanh Pham
(74) Attorney, Agent, or Firm—John R. Biggers; Mark S. Walker; Biggers & Ohanian, LLP

(57) ABSTRACT

Development of domain-specific analytic applications having predefined data mining models, including identifying a business problem to be solved; selecting a data mining algorithm appropriate for solving the business problem; defining data schema for use as inputs and outputs to and from the mining algorithm, the data schema including input data schema and output data schema; and defining a mining model based on the data schema to solve the business problem; whereby a domain-specific analytic application is developed, the analytic application having at least one predefined data mining model, the analytic application having the capabilities of: populating the input data schema with sample historical data; production training the mining model using the sample historical data in the input data schema, whereby a production trained mining model is created; and production scoring production data using the production trained mining model, production scoring further comprising applying the production trained mining model to production data.

57 Claims, 4 Drawing Sheets

| Data Element Name | Data Element Meaning or Usage |
|---|---|
| shopper_id | Unique identifier for the shopper — 202 |
| income | Shopper's income rounded to the closest $5000 — 204 |
| age | Shopper's age rounded to the closest multiple of 5 — 206 |
| gender | Shopper's gender (M or F) — 208 |
| household | Number of household members — 210 |
| sales_revenue | Sales revenue contributed by the shopper to the closest $100 — 212 |

| Parameter Purpose | Parameter Name | Parameter Example Value | |
|---|---|---|---|
| Settings | Name | Shopper settings | 302 |
|  | Mining function | Prediction - Radial Basis Function | 304 |
| Input data | Input data | Shopper data | 306 |
|  | Optimized mining run for | Time | 308 |
| Mode parameters | Use mode | Training mode | 310 |
|  | In-sample size | 2 | 312 |
|  | Out-sample size | 1 | 314 |
|  | Maximum number of passes | 4 | 316 |
|  | Maximum centers | 10 | 318 |
|  | Minimum region size | 5 | 320 |
|  | Minimum passes | 2 | 322 |
| Input fields | Active fields | income, age, gender | 324 |
|  | Supplementary fields | household | 326 |
|  | Prediction field | sales_revenue | 328 |
| Quantiles | Generate quantiles | No | 330 |
| Output fields | Output fields | shopper_id | 332 |
|  | Predicted value field name | Predicted sales_revenue | 334 |
| Output data | Output data | Output sales_revenue | 336 |
| Results | Results name | Prediction model for sales_revenue | 338 |
|  | If a result with this name exists, overwrite it | True | 340 |

FIG. 3

METHOD AND SYSTEM FOR SIMPLIFYING THE USE OF DATA MINING IN DOMAIN-SPECIFIC ANALYTIC APPLICATIONS BY PACKAGING PREDEFINED DATA MINING MODELS

BACKGROUND OF THE INVENTION

1. Field of the Invention

The field of the invention is data processing, that is, methods and systems for financial, business practice, business management, or cost/price determinations.

2. Description of the Related Art

A data mining tool is computer software that analyzes data and discovers relationships, patterns, knowledge, or information from the data. Data mining is also referred to as knowledge discovery. Data mining tools attempt to solve the problem of users being overwhelmed by the volume of data that computers can collect. Data mining tools attempt to shield users from the unwieldy body of data by analyzing it, summarizing it, or drawing conclusions from the data that the user can understand. For example, one known computer software data mining product is IBM's "Intelligent Miner" which can be operated in several computing environments including AIX, AS/400, and OS/390. The IBM Intelligent Miner is an enterprise data mining tool, designed for client/server configurations and optimized to mine very large data sets, such as gigabyte data sets. The IBM Intelligent Miner includes a plurality of data mining techniques or tools used to analyze large databases and provides visualization tools used to view and interpret the different mining results.

An analytic application is a software application that inputs historical data collected from a production system over time, analyzes samples of this historical data and outputs the findings back to the production system to help improve its operation. For example, an e-commerce server that manages an internet shopping site is a production system, and an analytic application might use historical data collected from the e-commerce server to report on what type users are visiting the site and how many of these are actually buying products. The term "analytic application" is used throughout this specification to mean "analytic software application," referring to that category of software typically understood to be used directly by users to solve practical problems in their work.

Data mining is an important technology to be integrated into analytic applications. Data mining data processing technology, combinations of hardware and software, that dynamically discover patterns in historical data records and apply properties associated with these records (e.g., likely to buy) to production data records that exhibit similar patterns. Use of data mining typically involves steps such as identifying a business problem to be solved, selecting a mining algorithm useful to solve the business problem, defining data schema to be used as inputs and outputs to and from the mining algorithm, populating input data schema with historical data, training the model based upon the historical data, and scoring production data by use of the model.

In prior art, however, with available data mining tools, the end user of an analytic application must be sufficiently skilled in data mining to accomplish all these tasks, some of which require substantial expertise in data mining. For applications such as e-commerce, which are being widely adopted by businesses of all sizes and in all commerce areas, it is difficult and expensive for every business using data mining to acquire substantial data mining expertise. It would be desirable and useful, therefore, for an analytic application to integrate data mining so as to reduce the need for end users to have special expertise in data mining as such.

SUMMARY OF THE INVENTION

Embodiments of the present invention include methods and systems in which elements of data mining, such as identifying a business problem to be solved, selecting a mining algorithm useful to solve the business problem, defining data schema to be used as inputs and outputs to and from the mining algorithm, and defining data mining models, are performed by an analytic application developer. An "analytic application developer" is a software developer that develops analytic software applications. Throughout this specification, the analytic application developer is described in contrast to end users. An "end user" is a person or entity that installs and uses an analytic application for purposes of scoring and analyzing actual production data. Analytic application developers create the analytic applications that end users use.

In typical embodiments of the invention, the analytic application developer identifies a set of interesting business problems capable of definition sufficient to support data mining solutions. The analytic application developer then selects data mining algorithms useful for solving the identified problems, defines data schema useful as inputs to and outputs from the selected mining algorithm, and defines data mining models. Because the mining algorithms, the data schema, and the mining models are selected, identified, and defined prior to involvement by any end user, the mining algorithms, data schema, and mining models are referred to as being "preselected" and "predefined."

In typical embodiments of the present invention, it is end users who carry out the data mining steps of populating input data schema with historical data, training the model based upon the historical data, and scoring production data by use of the model. Because the more difficult steps of defining business problems, preselecting mining algorithms, and pre-defining data schema are performed by an analytic application developer before an end user acquires the analytic application, the end user need only perform straightforward steps guided by such routine graphical user interface elements as mouse-clickable buttons, pull down menus, and wizards. The overall effect of the inventive method is to greatly reduce the data mining expertise needed by the end user.

Use of data mining typically involves steps such as identifying a business problem to be solved, selecting a mining algorithm useful to solve the business problem, defining data schema to be used as inputs and outputs to and from the mining algorithm, populating input data schema with historical data, training the model based upon the historical data, and scoring production data by use of the model.

A useful key to simplifying the use of data mining in analytic applications is to make the analytic application domain-specific. "Domain" refers to a problem subject area, and "domain-specific" means that an analytic application is designed to operate on the basis of data related to a particular problem subject area, where the data has specific defined data elements with defined relations among the data elements. For example, e-commerce is a specific domain, and a domain-specific analytic application for e-commerce would accept and analyze only e-commerce data. For illustration purposes in this specification, e-commerce is chosen as the domain of interest.

For a specific domain, it is a typical use of embodiments of the present invention to identify business problems that are applicable to such a specific domain. Once the business problems that need data mining are identified, embodiments of the invention then typically are used to build an analytic application to solve these business problems so that the analytic application developer can embed in the analytic application all data mining related knowledge needed for the solution so that the end user of the application does not require data mining specific expertise.

The steps of the inventive method in an example business problem are discussed in detail in this specification. Process flow involved in steps of typical embodiments is described by the diagram given in FIG. 1. In typical embodiments, as mentioned above, the steps of defining business problems, preselecting mining algorithms, predefining data schema, and predefining data mining models are done by the analytic application developer, whereas only the steps of populating the input data schema with historical data, production training the model, and production scoring are left to the end user.

This specification describes sets of business questions useful to the end users, predefined, and the data schema that are needed to answer these business questions, also predefined. This specification describes data mining models predefined, tested and shipped with a product which can then be trained and applied by the end users without needing data mining expertise.

A data mining model is usually defined to address a given business question based on a given input data schema. Data mining tools such as IBM's Intelligent Miner typically are generic, functioning independently of any application. Because data mining tools do not include business questions or the data schema end users would use, developers of data mining tools do not in prior art supply predefined mining models.

Accordingly, in an integrated e-commerce analytic solution using general-purpose data mining tools such as Intelligent Miner, there is significant benefit in predefining mining models whenever possible as this will enable end users to train and apply these models without requiring data mining expertise. Intelligent Miner provides simple user interface to import predefined mining models and to train and apply these models without any knowledge of data mining. The steps for using Intelligent Miner to import, train and apply can also be documented along with the predefined mining models to simplify the job of the end user.

There are several advantages to the present inventive method. When predefined mining models are available to the end users, end users can make use of their regular information technology staff to train and apply these mining models without having to first train the staff in mining technology and mining tools. This results in significant cost savings to end users.

An additional benefit is that a product vendor, by use of the method of the present invention, can build an e-commerce analytics product in the vendor's development shop. As a result, the vendor can ship several mining models ready to be used by end users straight out of the box, requiring no special expertise in data mining on the part of the end user's staff. This will add significant value to the vendor's product as it reduces end users' costs.

A still further benefit of the present invention is that third-party vendors can use the method of the invention to add additional mining models to an already available analytic product. In addition, consultants can use the inventive method to define and add new mining models at a end user site or even to the analytic product itself at the development site.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 2 is an example input data schema for an exemplary embodiment.

FIG. 3 is an example of a data mining model definition.

DETAILED DESCRIPTION OF ALTERNATIVE EMBODIMENTS

The present invention is described primarily in terms of a method for simplifying the use of data mining in domain-specific analytic applications by packaging predefined data mining models. Persons skilled in the art, however, will recognize that any computer system that includes suitable programming means for operating in accordance with the disclosed method also falls well within the scope of the present invention.

Suitable programming means include any means for directing a computer system to execute the steps of the method of the invention, including for example, systems comprised of processing units coupled to computer memory, which systems have the capability of storing in computer memory programmed steps of the method of the invention for execution by a processing unit. The invention also may be embodied in a computer program product, such as a diskette, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product.

"Data schema" are data structures, defined aggregates of data elements. In this specification, the term "data schema" is used to refer both to schema and to data stores fashioned in dependence upon schema. The terms "fields" and "data element" are used as synonyms. The term "record" is used to refer to specific instances of data schema.

Embodiments of the present invention include methods and systems in which elements of data mining, such as identifying a business problem to be solved, selecting a mining algorithm useful to solve the business problem, and defining data schema to be used as inputs and outputs to and from the mining algorithm, are performed by an analytic application developer. An "analytic application developer" is a software developer that develops analytic software applications. Throughout this specification, the analytic application developer is described in contrast to the end user. An "end user" is a person or entity that installs and uses an analytic application for purposes of scoring and analyzing actual production data. Analytic application developers create the analytic applications that end users use.

Figure 1:
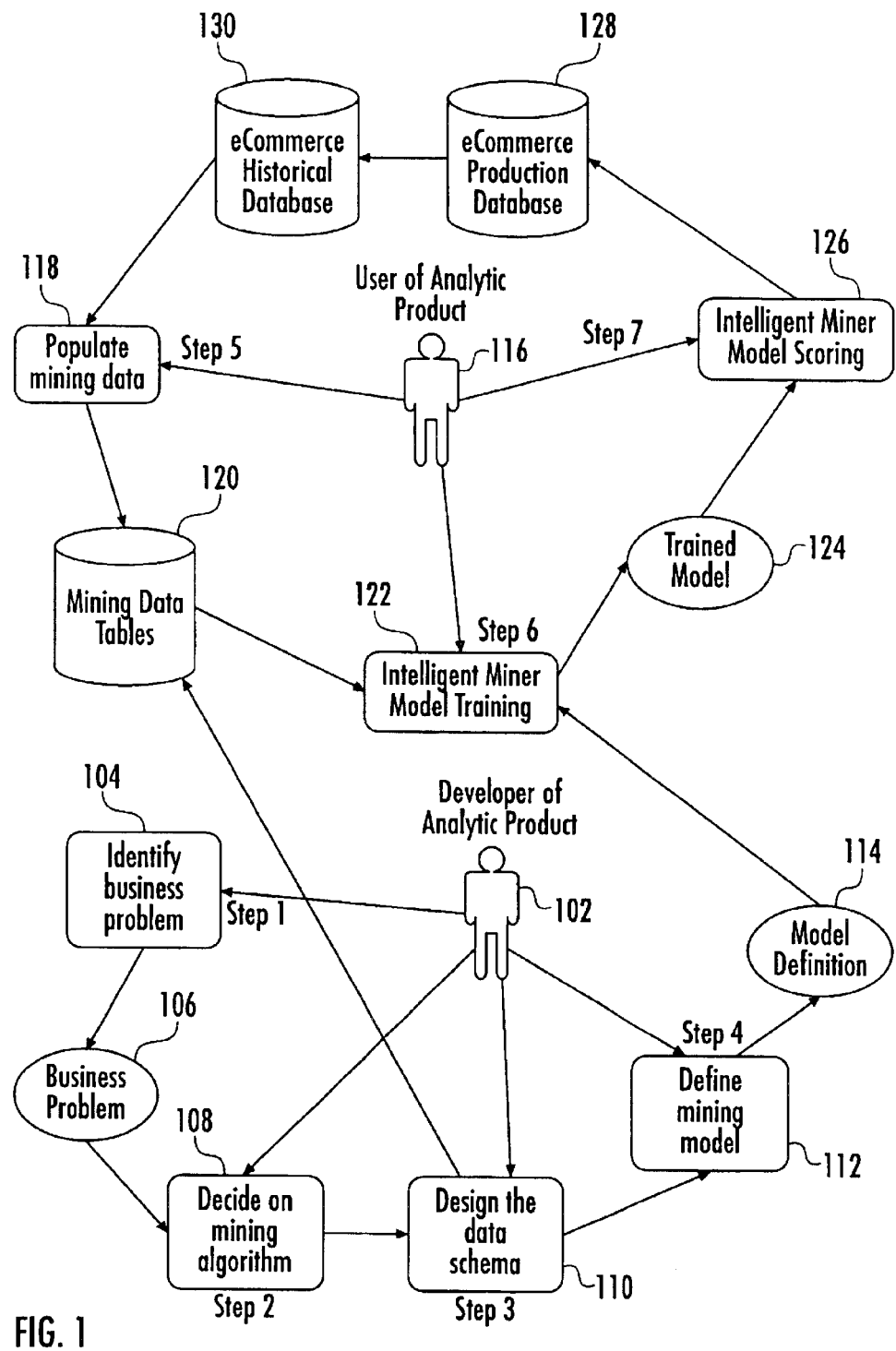
FIG. 1 is a process flow diagram for the method of predefining models for data mining.

Turning now to FIG. 1, an exemplary embodiment of the invention is seen in which an analytic application developer (102) identifies (104) at least one business problem (106) and identifies a mining algorithm (108) useful in solving the at least one identified business problem (106). The analytic application developer, in the illustrated embodiment, also designs data schema (110), which in typical embodiments includes input data schema and output data schema, useful for providing data input to and output from the identified mining algorithm and defines a mining model (112), thus creating a model definition (114), for use in solving the business problem.

In the illustrated embodiment, an end user populates (118) mining data tables (120) with historical data (130) and also with production data (128). "Production data" refers to an end user's usual operational data store. "Historical data" refers to data extracted over time from the production data. Because the historical data is extracted over time, in some embodiments the historical data is a superset of the production data in that the historical data includes also data extending over a longer period of time than is maintained in the production data or summaries of historical data that are not maintained in production data. In some embodiments the historical data is a subset of the production data in the sense that history is maintained on fewer fields or data elements than reside in production data. How closely aligned in time the historical data is with respect to production data depends on how often additional historical data is extracted from production data. Any useful extraction schedule is well within the present invention.

The mining data tables (120) are comprised of the input data schema from the designed data schema (110). In typical embodiments, the input data schema, which are typically populated from the historical data, are a subset of historical data elements. In the illustrated embodiment, the model definition (114) is used by the end user (116) to train (122) the untrained model defined in the model definition (114). Training (122) creates a trained model (124).

A trained model includes a repository of knowledge obtained through training, which knowledge is gathered and stored in a repository sometimes called a mining base, although in this specification, the repository is referred to as a "knowledge base." The contents of knowledge bases depends on the kind of data mining algorithm selected for use in a particular data mining model. Knowledge bases used with radial basis function algorithms, for example, contain data describing fitting centers and weighted sums. Knowledge captured in a knowledge base through model training is used by data mining tools internally in applying a data mining model through production training and production scoring. A trained model, as shown in FIG. 1, is typically used to score (126) historical data (128), although as will be discussed below in more detail, some embodiments conduct production scoring directly against production data as such.

In addition to the embodiment just discussed, this specification provides below a more detailed discussion of an embodiment developed with respect to an exemplary business problem. The present invention is often described in this specification in conjunction with the well-known IBM data mining tool called "Intelligent Miner." Of course persons skilled in the art will realize immediately that any general-purpose data mining tool providing standard data mining functionality can be used to carry out the pertinent data mining steps of the present invention.

In this specification, the terms "input data," "input schema," "output data," and "output schema" refer to inputs and outputs to and from data mining algorithms in data mining models. Naturally there are other processes having inputs and outputs. Data output from historical data, for example is input to data schema used for data mining. And data output from data mining is input to production data. Nevertheless, by convention in the following discussion, "input data," "input schema," "output data," and "output schema" refer to inputs and outputs to and from data mining algorithms in data mining models.

Identifying a Business Problem to be Solved

For e-commerce, consider the following business problem:

"Predict sales revenue for a business enterprise from any new shopper."

This business problem requires us to predict for each new shopper the amount of revenue the shopper is expected to contribute to the business. Although the business problem is phrased in plain English, it is important to note that the business problem must be one that is amenable to semantic definition in terms capable of representation in data elements for automated computation. More specifically, the problem to be solved must be capable of expression through the use of referents that are defined in a specific computational domain. Defining referents in a specific computational domain means that a problem is selected for analysis that is capable of being described by use of words having analogous data elements in a specific computational data structure or data store. That is, a problem in order to be eligible for solution within the present invention must be one capable of being stated in plain human language having elements of language within the statement of the problem, and, for each such element pertinent to solution of the problem, there must exist in a defined data structure data having a semantic relation with the language elements of the statement of the problem. By "semantic relation" is meant that the data elements correspond to, evaluate, or identify aspects of the problem as stated that are needed to solve the problem.

In the case of the problem stated above regarding shopper sales revenue, for example, data elements corresponding to, evaluate, or identifying shoppers and sales revenue will need to exist in order for the problem to be one that is amenable to solution within the present invention. In the present example, data elements representing sales revenue clearly can be stored in a numeric memory variable. Similarly a shopper identification code can be stored in a text or numeric memory variable. As we discuss in more detail below, shopper attributes such as age, gender, annual household income, years of education, or zip code, also are capable of representation and storage in computer data elements.

Although we select this particular business problem to illustrate how an analytical application can be built to solve this business problem without requiring mining expertise from the end user, it should be clear to those skilled in the art that it is well within the scope of the present invention to solve many other business problems in addition to the present example regarding shopper sales revenue. Additional business questions addressable by use of the present invention include, for example, (1) the question of the how incentive campaigns affect sales revenue for customers and (2) the question of how frequent visits by sales representatives reduce sales revenue for customers who are young.

It is a purpose of the present invention to reduce the staff burden of expertise in data mining for end users. Accordingly, therefore, in typical embodiments and uses of the present invention, the identification of the business problem itself is done by the analytic application developer rather than the end user.

The Step of Selecting a Mining Algorithm Needed to Solve the Business Problem A further step in the inventive method is identifying a mining algorithm useful for solving the business problem. There are a number of data mining algorithms that are effective for solving various kinds of business problems, including for example, demographic and neural clustering algorithms, tree and neural classification algorithms, radial-basis-function ("RBF") and neural value-prediction algorithms, and the associations algorithm. For information regarding data mining algorithms, the reader is directed to "Data Mining Techniques: For Marketing, Sales, and Customer Support", by Michael J. A. Berry and Gordon Linoff (John Wiley & Sons; ISBN: 0471179809, 1997). Because the exemplary case under discussion requires predicting the value of sales revenue, in accordance with the inventive method, the data mining algorithm known as the value-prediction algorithm is selected as the algorithm needed to solve the business problem. The determination to use a particular data mining algorithm, in this example the value-prediction algorithm, is made by the analytic application developer.

Defining the Data Schema to be Used as an Inputs to and Outputs from the Mining Algorithm A further step in the inventive method is defining data schema used as input to and output from the mining algorithm. The data schema are defined by the analytic application developer. In the case of the present exemplary embodiment, the input data schema required for solution of the business question is captured in a single database table having the data elements set forth in FIG. 2. The data elements of the schema (200) illustrated in FIG. 2 include "shopper_id" (202), a unique identification code for a shopper; "income" (204), the shopper's household income rounded to the closest $5,000.00, "age" (206), the shopper's age rounded to the nearest multiple of 5; "gender" (208), the shopper's gender, male or female; "household" (210), the number of members of the shopper's household; and "sales_revenue" (212), the sales revenue contributed by the shopper rounded to the nearest $100.00.

"SQL" is the industry-standard data base query language known as the "Standard Query Language." The following script, set forth in the industry-standard SQL Data Definition Language ("DDL") is an example of a script useful within the present invention to create the database table SHOPPER, based upon the schema described above and illustrated in FIG. 2:

create table SHOPPER
(
shopper_id bigint NOT NULL,
income integer,
age integer,
gender character (1),
household integer,
sales_revenue double,
PRIMARY KEY (shopper_id)
)

The first five attributes shopper_id, income, age, gender and household, in this exemplary embodiment, are data attributes of the shopper both in historical data and in production data. The attribute sales_revenue has a value on record in historical data because the historical data records already record how much money past shoppers have spent on the e-commerce site. The value of sales_revenue, however, is unknown in production data because the analytic application before it is operated to score production data has not yet recorded predicted values for the future of how much money new shoppers may spend. The value of sales_revenue, therefore, needs to be predicted using data mining techniques. Fields identified within a mining model as fields whose values are to be predicted are called "prediction fields." Because the value of sales_revenue is to be predicted in the present example, sales_revenue is called a prediction field.

Defining data schema includes defining output data schema. The principal useful output of the data mining algorithm is the value prediction or data classification that is the purpose of the data mining model in use. The output of the data mining algorithm is scored data to be stored with production data. That is, the results of the data mining, the data in the output data schema, in order to be useful is to be deposited in the end user's repository of production data. Moreover, the output results need to be returned to a meaningful location within the production data. Output data schema therefore typically contain one or more prediction fields and one or more key fields for finding within the production data the correct location for storage of the data mining output results.

In the exemplary embodiment regarding shopper sales revenue, as shown in FIG. 2, there is available for inclusion in output data schema a single-field unique key for location of shopper data, "shopper_id" (202). The output data schema in the example embodiment also includes a field for storage of the predicted sales revenue, the prediction of which is the principal purpose of the exemplary embodiment under discussion.

Thus in the exemplary embodiment under discussion, the output schema includes two fields: a unique key for location of shopper data and a field for predicted sales revenue. Embodiments utilizing multi-field keys rather than single-field keys typically include all the fields of such multi-field keys, and the output schema in such embodiments therefore comprises more than two fields. As illustrated in FIG. 3, the data mining model definition includes a file name for the output data schema, and the name of the file containing the output data schema in the exemplary embodiment regarding shopper sales revenue is depicted as "Output sales_revenue" (336).

Defining a Mining Model Based on the Data Schema to Solve the Business Problem The method of the present invention includes defining a mining model. Defining a mining model typically includes operating the model's principal algorithm in a training mode. The algorithm discussed in the present exemplary embodiment, the value-prediction algorithm, has two modes, a training mode and a scoring mode. In training mode, the value-prediction algorithm builds a data mining model based on a subset of the selected input data, that is, a subset of the historical data. The rest of the input data is used implicitly by the algorithm to test the quality of the model as trained.

The remaining historical data is used to test the trained model because for the historical data, the answer to the question of sales revenue is already known for all the shoppers represented in the historical data. That is, the algorithm carries out development scoring upon the remaining historical test data and then immediately determines the quality of the scoring because the correct scoring is already known for this class of data.

Training a data mining model typically involves training the data mining model using a portion of the input data immediately followed by a test using all or part of the remaining historical data. In the test phase the training model is made to predict the sales revenue. This predicted value is then compared with the known value of sales revenue. Model quality is decided based on how well the model predicts sales revenue.

It is useful to note that the training under discussion is development training in support of defining a mining model. Development training is part of defining a mining model that works well for the particular business question to which it is directed. Development training is conducted in a cycle of training and testing for the purpose of identifying data mining model parameters, parameter that in fact comprise the definition of a particular data mining model. Development training is work requiring a high level of specific expertise in data mining. The result of development training is a predefined mining model for inclusion in an analytic application for use by a end user.

In contrast, production training of a mining model for use with end user production data is training a predefined mining model already known to work well in solving the business question to which it is addressed. That is, production training is training a predefined model to work with the particular historical data for the end user's actual production data, in the exemplary embodiment under discussion, actual shopper data. In other words, a first instance of production training can be viewed as in effect a kind of installation step by the end user. In this context, "installation step" means that production training must be done at least once before an end user can begin production scoring. That is, production training is performed at least once as a preparatory step prior to any production scoring. Production training of a mining model is triggered by an end user requiring no specific expertise in data mining.

Predefined data mining models, however, are production trained more than once. Data mining models in analytic applications from time to time need their training refreshed because the fundamental characteristics of the underlying production data changes over time. In the embodiment regarding shopper revenue, for example, the characteristics of the population of shoppers comprising the production data will drift over time. Production training of a mining model, however, from the point of view of an end user, is an administrative step to be performed by end users having no particular expertise in data mining.

The mining model, whether performing development scoring or production scoring in actual production, predicts a value for one or more prediction fields. The term "scoring" refers to a process of predicting a value for a prediction field. Other fields, typically included in input schema, that are used by a data mining algorithm to help predict the prediction field are called "predictor fields," or simply "predictors." In the case of the example under discussion, the predictor fields are income, age, gender, and household. In production scoring, the data mining algorithm applies the trained model on production data. In development scoring, the data mining algorithm is applied to a sample of historical data. In production scoring, a predefined mining model is applied on actual production data.

An example of a definition of a mining model is set forth in FIG. 3. In particular FIG. 3 illustrates parameters defining a mining model for the exemplary embodiment regarding shopper revenue. FIG. 3 is organized in three columns illustrating respectively the purpose, name, and example values for model definition parameters useful in predicting shopper sales revenue.

The model definition shown in FIG. 3 includes the settings parameters "Name" (302) and "Mining function" (304). The model Name (302) is set to "Shopper settings," indicating that the model under definition is the model to be used for predicting shopper revenue. Mining model definitions are typically embodied in data structures for storage in computer memory, and when so embodied, the model Name (302) typically is used as a pointer or search field to retrieve from storage either the entire model definition or data elements from the model definition.

The "Mining function" parameter (304) is set to "Prediction—Radial Basis Function," indicating that the radial basis function algorithm is to be used for value-prediction. Other algorithms are used in various embodiments of definitions of mining models, but in the one shown for example in FIG. 3, the radial basis function algorithm is selected.

The radial basis function algorithm is a data mining algorithm particularly designed for value prediction as such, as opposed to data classification or pattern matching. The purpose of value prediction is to discover the dependency and the variation of one field's value (that is, a prediction field) upon the values of other fields (that is, predictor fields) within the same record of input data. A model is generated that can predict a value for that particular prediction field in a new record of the same form, based on the predictor field values.

In the present example regarding shopper revenue, an end user such as a retailer wants to use historical data to predict the sales revenue for a new customer. One or more runs of development training, using the historical data as input data, creates a defined mining model. The defined mining model can be used to predict the expected sales revenue for a new customer, based on the values of the predictor fields for the new customer, that is, based upon the data elements or fields that describe the new customer and comprise predictor fields for use by the value prediction algorithm, the radial basis function algorithm, in the mining model.

The data mining algorithm functions by processing a table of input data in which every record has an identical format. A single field within the table, the prediction field, is to be designated as containing the value to be predicted, while the coordinates, the predictor fields, are selected from the other fields in the table.

The radial basis function algorithm is used to predict values of a prediction field which value is a function of a multiplicity of variables, that is, a function of data comprising more than one predictor field. The radial basis function algorithm is used to create a data mining model that predicts the value of a particular prediction field from the other attribute values, the predictor fields.

The predictor fields form an attribute space. The radial basis function algorithm operates by use of a number of fitting centers disposed in the attribute space. A fitting center is a vector in the attribute space. At each fitting center, a basis function is defined. A basis function is a nonlinear function of distance from the fitting center at which the basis function is defined. The basis functions are called radial basis functions because they have the same value for any point having the same distance or radius from the fitting center. The prediction given by the radial basis algorithm for a particular set of attributes or prediction fields (called a "point") is a weighted sum of the basis function values calculated at that point. During the operation of the radial basis function algorithm, the weighted sums of values producing the best predictions are determined by the algorithm at each fitting center. In addition, the radial basis function algorithm determines where the fitting centers are to be placed in the attribute space for best operation of the algorithm. The fitting center locations in the attribute space and the weighted sums of values producing best predictions are gathered into data structures and stored in a knowledge base. A trained model in effect comprises a set of defining parameters as shown in FIG. 3 and a knowledge base produced by operation of a mining model in training mode. The reader is directed to IBM's user guide for Intelligent Miner, "Using Intelligent Miner for Data," Volume 6, Release 2, Chapter 16, incorporated herein by reference, for information regarding typical usage of the radial basis function algorithm.

The details of knowledge base construction for data mining are not recounted in this specification. The details of knowledge base construction for data mining are complex, and they differ across algorithms. As mentioned above, radial basis function algorithms produce knowledge bases containing data comprising fitting centers and weighted sums. Tree classification algorithms produce knowledge bases comprising classification rules. Demographic clustering algorithms produce knowledge bases comprising model statistics including distributions of members across clusters. For information regarding knowledge bases, the reader is directed to "Data Mining Techniques: For Marketing, Sales, and Customer Support", by Michael J. A. Berry and Gordon Linoff (John Wiley & Sons; ISBN: 0471179809, 1997).

Again referring to FIG. 3, we discuss the parameters comprising a mining model definition. The Input Data parameters include "Input Data" (306) and "Optimize mining run for" (308). In the example as illustrated in FIG. 3, Input Data is set to "Shopper data," indicating the data file from which historical data is to be read for training the model. The "Optimize mining run for" element is set to "Time," indicating that built-in optimization functionality in the data mining product in use in the example is to be administered automatically in favor of speedy operation.

The Mode parameters in the model definition include "Use mode" (310), "In-sample size" (312), "Out-sample size" (314), "Maximum number of passes" (316), "Maximum centers" (318), "Minimum region size" (320), and "Minimum passes" (322). In the example as illustrated in FIG. 3, "Use mode" (310) is set to "Training mode," indicating that model operation is set to effect model training.

The Mode parameter "in-sample size" (312) in the illustrated example is set to "2," representing the number of consecutive records to select from the input data to be used for training. During model training, model training operations use one portion of the historical data for building a development model and a second portion of the historical data to verify the accuracy of the development model. During the verification phase, the number of records specified in "in-sample size" is skipped, excluded from the data used for verification. The Mode parameter "out-sample size" (314) is set to "1," representing the number of consecutive records to select from the input data to be used when model training shifts to the verification phase to determine whether desired accuracy and error limit objectives for the model under development have been met. When these goals are met, the training process ends.

The value for "maximum number of passes" (316) is set to "4," limiting the number of times the mining model goes through its input data in training mode. Prediction accuracy is checked typically after each pass through the input data. If the model reaches the desired prediction accuracy before this limit is reached, training will stop.

The value for "maximum centers" (318) is set to "10," limiting the number of fitting centers created by the mining function at each pass through the input data. The actual number of centers might be higher than the number specified as a parameter in the model definition as "maximum centers" (318) because the number of centers can increase up to twice the initial number during a training pass through the input data.

The radial basis function algorithm works by choosing a weighted sum of a set of non-linear functions called radial basis functions. The radial basis functions are each fitted to separate regions in the input space. The regions are chosen so that the prediction field values output are similar within a region, so that the radial basis function is likely to produce accurate prediction field values. For each selected region, a fitting center is created that predicts the average value of the region. More specifically, the fitting center comprises the regional average prediction field value. Data points that fall between regions are predicted by taking a weighted average of the predictions of all fitting centers, where the weight for a fitting center decays rapidly with the distance of data points from the fitting center.

In order for a region to be useful in operation of the radial basis function algorithm, the region needs to have some minimum size. In the example mining model definition illustrated in FIG. 3, the value for "minimum region size" (320) is set to "5", indicating the minimum number of records or data points to be assigned to a region. If at the end of a pass a region has a size smaller than the specified minimum region size, the region is deleted. For additional information regarding the definition and use of fitting centers and regions in data mining algorithms, the reader is directed to "Data Mining Techniques: For Marketing, Sales, and Customer Support", by Michael J. A. Berry and Gordon Linoff (John Wiley & Sons; ISBN: 0471179809, 1997).

In FIG. 3, the value for "minimum passes" (322) is set to "2," indicating the minimum number of passes through the sample historical input data during operation of the model in training mode. During passes numbering less than the specified minimum, in typical embodiments, no checking for accuracy is done. In some embodiments, it saves processing time to set some minimum number of passes to be made without accuracy checks, although a large value for minimum passes generally ought to be specified only when there is a large quantity of available training data and the analytic application developer is certain that a good model exists.

The Input fields parameters in the model definition include "Active fields" (324), "Supplementary fields" (326), and "Prediction field" (328). In the example as illustrated in FIG. 3, the "Active fields" (324) are the predictor fields, and the parameter "Active fields" (324) is set to "income, age, gender," indicating that the fields income, age, and gender are to be used by the mining model as predictor fields to train the model to predict sales revenue from new shoppers.

Many embodiments of data mining tools provide statistical services related to model training or data scoring. In IBM's Intelligent Miner, for example, data mining statistics are maintained both for the "Active fields" (324) (that is, the predictor fields) and also for the "Supplementary fields" (reference 326 on FIG. 3). In the model defined for example in FIG. 3, the fields used for statistical purposes exclusively, rather than for prediction, are referred to as "supplementary fields." These supplementary fields do not directly affect the process of developing or training a mining model. In the example of FIG. 3, "Supplementary fields" (326) is set to "household," indicating that mining-related statistics will be generated or maintained for the field "household," although "household" is not used as a predictor field in the present example.

In the example model of FIG. 3, "Prediction field" (328) is set to "sales_revenue," indicating the value of the field sales_revenue is the value to be predicted by the model. That is, sales_revenue is what the model is to train to predict, and sales_revenue is the value to be predicted in development scoring operations and eventually also in operations scoring.

Quantile ranges are subsets of data within a specific range of the predicted value. The quantile limits represent the lower and the upper percentage of the predicted value. For example, the quantile range Q[50,75] contains records whose predicted values are between the quantiles Q(50) and Q(75) of the multiset of all predicted values. If quantiles are generated, a mining model is used to classify the value in the prediction field according to the quantile in which it falls. In the model defined in FIG. 3, however, the quantile field "generate quantiles" (330) is set to "no," indicating that the mining model as defined in FIG. 3 will not generate quantiles.

The Output fields parameters are "Output fields" (332) and "Predicted value field name" (334). In the example as illustrated in FIG. 3, Output fields is set to "shopper_id," indicating that the value of the field named "shopper_id" is to be copied directly from the input data to the output, in this case carrying through a unique identification of a shopper from the input to the output. The layout of the output data corresponds to the appropriate input data. The output data includes the fields specified in "output fields" (332), i.e., the specified output fields are copied into the output. In addition, the model as defined specifies the "predicted value field name" (334). In the illustrated example embodiment, the "predicted value field name" (334) is separately identified as "Predicted sales_revenue" because it must be output regardless whether other output fields are specified. "Predicted value field name" (334) is set to "Predicted sales_revenue," indicating that the predicted values of sales revenue generated by operation of the mining model are to be written to an output record field named "Predicted sales_revenue."

The Output data parameter "Output data" (336), in the example mining model definition as illustrated in FIG. 3, is set to "Output sales_revenue," indicating the data file where the output fields are to be written.

By default in typical embodiments and for example in IBM's Intelligent Miner, a result object, such as an output file, takes on the name of the settings object that created the results. In this example, the settings object is the mining model definition illustrated in FIG. 3, a model definition having the name "Shopper settings" (302). Thus there would typically be no need to specify a result name when running the settings object, the mining model, for the first time. However, an analytic application developer might want to run the settings object again and keep the old results. In this case, the developer would need to change the original result name, particularly when as in the example of FIG. 3, the model is set (340) to overwrite previous results having the same name as current results. In the example of FIG. 3, the results name (338) is set to "Prediction model for sales_revenue."

The terms "train a model," "generate a production model," and "create a model for use in production scoring" all mean the same thing. In this sense, a trained model includes a model definition of the kind illustrated in FIG. 3. In addition to the model definition, a "production model" or "trained model" includes also the knowledge base generated by operation of the model in training mode.

In a production model, the Mode parameter "Use mode" (310) in the model definition will be set to "application mode," indicating that the model will carry out data scoring without accuracy checks. Typically in application mode, accuracy checks are not possible because there are no historical data regarding prediction field values against which accuracy checks can be made. In application mode, the function uses a model created in training mode to predict a value for the specified prediction field for every record in the new input data, the new input data comprising typically large quantities of end user production data. The data format for input to the production model must be identical to that used to generate the model in training mode.

Populating the Input Data Schema with Historical Data

Figure 4:
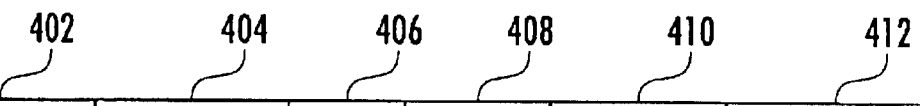
FIG. 4 is an example of historical sample data used for training a data mining model.

The inventive method includes a step of populating input data schema with historical data, that is, extracting data from a repository of historical data and writing that data into the input data schema. Populating input data schema does not require special expertise in data mining and can be done by an end user. FIG. 4 illustrates an example of historical data (400) that can be used in the example embodiment to populate input data schema comprising an input to a mining model operating in production training mode. As illustrated in FIG. 1, in typical embodiments of the inventive method, data mining tables (120) implementing input data schema (110) are populated (118) from databases of historical data (130). FIG. 4 illustrates an example of the input data schema (110) that is shown in context in FIG. 1.

Although populating input data schema is described in this specification as a capability of an embodiment of the invention, persons skilled in the art will realize that there are many ways to populate data schema, all of which are well within the scope of the present invention, including, for example, scripts operating at the level of an operating system and compiled programs capable of calling API functions in APIs associated with particular database management systems.

The populating procedure (118 on FIG. 1) extracts from historical data (130) the data needed for use in a particular data mining model. Because the example model is designed to address the business problem of predicting shopper sales revenue by use of data schema designed for that purpose, the data elements in the populated input data schema illustrated in FIG. 4 are shopper_id (402), income (404), age (406), gender (408), household (410), and sales_revenue (412), each of which has the same meaning and usage as described above in our discussion of the exemplary input data schema.

Production Training of the Mining Model by Use of Historical Data

When the mining model is defined and the input data schema is populated with historical data, the mining model can be production trained using the historical data in the input data schema. To distinguish development training, this training step is referred to as "production training." Production training does not require special expertise in data mining and can therefore be done by the end user. The analytic product in typical embodiment provides clear documentation on which screen to go to and which button to click, often aided by wizards. To carry out the step of training the mining model, the end user only needs to have a general understanding of GUI tools, pull down menus and button clicks. It is possible for the end user to carry out data model training without special expertise in data mining because the necessary data mining related information is already provided in the definition of the mining model, the definition previously prepared by the analytic application developer.

Development training and production training are to be distinguished. Development training is carried out by an analytic application developer having special expertise in data mining. Development training is an iterative process of operating a data mining model against test samples of historical data in order to predict evaluation when evaluation is already known. The accuracy of the prediction is checked against the known evaluation in the historical data, and the mining model parameters are adjusted until the most accurate prediction is produced. The test samples of historical data are samples developed for use by the analytic application developer. The test samples sometimes are synthetic and sometimes are derived from a client or customer end user's actual historical data.

In contrast, production training is preparing a data mining model in a particular end user's installation so that the model functions correctly using as its principal input actual production data from the end user's production data store. Production training comprises running the data mining model in training mode using end user historical data in the input data schema. Production training is carried out periodically. Unlike the cyclic repetition of development training, however, periodic repetition of production training is not part of defining the data mining model. By the time an analytic application arrives for installation at an end user's installation site, the data mining model or models included within the analytic application are already defined, that is, predefined by an analytic application developer.

The purpose of carrying out production training periodically is to address the fact that the underlying nature or distribution of the production data may change somewhat over time. In the exemplary embodiment regarding shopper sales revenue, the behavior of end users' customers or shoppers changes somewhat over time. Periodically repeating production training tunes the installed data mining model for best performance with a particular end user's actual production data as the nature of the production data changes over time.

Analytic application embodying the present invention typically include predefined mining models developed as described above. Such analytic applications include data mining tools, such as, for example, IBM's Intelligent Miner. These mining models are loaded into the data mining tools when the analytic application is configured for installation at the end user's installation site.

Production Scoring Production Data Using the Trained Model

The inventive method in typical embodiments includes production scoring of historical data by use of a production-trained mining model. The mining model predicts a value for a prediction field for each data record in the model's input data. The term "scoring" refers to the process of predicting a prediction value by use of the data mining algorithm. The term "production scoring" refers to scoring of historical data by use of a trained and predefined mining model. In production scoring, the historical data in the input schema excludes historical values of prediction fields, or, if the input data schema includes historical values for prediction fields, such values are ignored or not used in production scoring. Production scoring results in predicted values for prediction fields for storage in production data and use in analysis by end users.

Production scoring is distinguished from development scoring in which scoring is carried out on historical data that includes and uses historical values of prediction fields for purposes of defining a data mining model and developing an analytic application. Because predictor field values are typically available in production data, some embodiments of the present invention read input data for production scoring directly from production data tables rather than extracting data for input schema from historical data or production data.

In the example under discussion, the prediction field is "sales_revenue." In the example under discussion, the data output from the operation of the mining model in production scoring includes predicted values of sales revenue for each data record input. The data records input include one record for each shopper for which sales revenue predictions are desired, the input data records comprising the input data schema for the mining model in use.

Scoring production data by use of the present invention does not require special expertise in data mining and can therefore be done by general end users. Analytic products embodying the present invention typically provide clear documentation on which screen to go to and which button to click to carry out scoring of production data. To score production data by use of the present invention the end user only needs to have a general understanding of standard graphical user interfaces for computer workstations including for example pull down menus and button clicks.

It will be understood from the foregoing description that various modifications and changes may be made in embodiments of the present invention without departing from its true spirit. In particular, although the present invention has been described in terms of business problems generally and sales revenue prediction in particular, in fact the present invention is useful for solving any problem capable of expression through the use of referents that are defined in a specific computational domain. It is intended that descriptions in this specification are only for purposes of illustration and are not to be construed in a limiting sense. The scope of this invention should be limited only by the language of the following claims.

What is claimed is:

1. A method of developing a domain-specific analytic application having at least one predefined data mining model, the method comprising the steps of:
   identifying a business problem to be solved;
   selecting a data mining algorithm appropriate for solving the business problem;
   defining data schema for use as inputs and outputs to and from the mining algorithm, the data schema including input data schema and output data schema; and
   defining a data mining model dependent upon the data schema, defining a data mining model resulting in the creation of a predefined data mining model;
   whereby a domain-specific analytic application is developed, the analytic application having:
      at least one predefined data mining model;
      a capability of production training the predefined data mining model using the historical data in the input data schema, wherein use of the capability of production training the predefined data mining model results in creation of a production trained data mining model; and a capability of production scoring production data by use of the production trained data mining model.

2. The method of claim 1 wherein the capability of production training the predefined data mining model further comprises the capability of operating the predefined data mining model in training mode using end user historical data in the input data schema.

3. The method of claim 1 wherein the capability of production scoring production data by use of the production trained data mining model further comprises the capability of applying the production trained data mining model to historical data stored in input schema.

4. The method of claim 1 wherein the capability of production scoring production data by use of the production trained data mining model further comprises the capability of applying the production trained data mining model to production data stored read from an end user's production database.

5. The method of claim 1 wherein the analytic application further comprises the capability of populating the input data schema with historical data.

6. The method of claim 5 wherein the capability of populating the input data schema with historical data further comprises the capabilities of extracting from historical data values of prediction data fields and writing the values of the prediction data fields into the input data schema for the data mining model.

7. The method of claim 1 wherein identifying a business problem to be solved further comprises identifying a business problem capable of expression through the use of referents that are defined in a specific computational domain.

8. The method of claim 1 wherein selecting a mining algorithm appropriate for solving the business problem further comprises selecting a radial basis function algorithm for value prediction.

9. The method of claim 1 wherein selecting a mining algorithm appropriate for solving the business problem further comprises selecting a neural value prediction algorithm.

10. The method of claim 1 wherein selecting a mining algorithm appropriate for solving the business problem further comprises selecting a demographic clustering algorithm.

11. The method of claim 1 wherein selecting a mining algorithm appropriate for solving the business problem further comprises selecting a neural clustering algorithm.

12. The method of claim 1 wherein selecting a mining algorithm appropriate for solving the business problem further comprises selecting a tree classification algorithm.

13. The method of claim 1 wherein selecting a mining algorithm appropriate for solving the business problem further comprises selecting a neural classification algorithm.

14. The method of claim 1 wherein selecting a mining algorithm appropriate for solving the business problem further comprises selecting an associations algorithm.

15. The method of claim 1 wherein defining data schema for the mining algorithm further comprises the steps of:

selecting from historical data for inclusion in input data schema predictor fields capable of supporting the use of a data mining algorithm in predicting the value of a prediction field; and selecting for inclusion in output schema at least one prediction field.

16. The method of claim 1 wherein defining data schema for the mining algorithm further comprises selecting for inclusion in output schema sufficient key fields to comprise a unique key for identification in production data of storage locations for the output data from the data mining algorithm.

17. The method of claim 1 wherein defining a data mining model based an the data schema further comprises establishing in a data structure comprising the data mining model definition values for fields defining the model.

18. The method of claim 17 wherein fields defining the model comprise:

field, representing the number of consecutive records to select from the input data schema to be used for training;

a field representing the number of consecutive records to select from the input data schema to be used for development scoring;

a field limiting the number of times the data mining model goes through its input data in training mode;

a field limiting the number of fitting centers created by the mining data mining algorithm at each pass through the input data;

a field indicating the minimum number of records to be assigned to a region;

a field identifying at least one predictor field; and a field identifying a prediction field.

19. The method of claim 1 wherein defining a data mining model based on the data schema further comprises the steps of:

establishing in a data structure comprising the data mining model definition values for fields defining the model; and development scoring historical data wherein test output data is created; and testing the test output data for accuracy wherein an accuracy valuation is created;

wherein the steps of establishing definition values, development scoring, and testing are repeated until the accuracy valuation meets a predetermined accuracy requirement.

20. A system for developing a domain-specific analytic application having at least one predefined data mining model, the system comprising:

means for identifying a business problem to be solved;

means for selecting a data mining algorithm appropriate for solving the business problem;

means for defining data schema for use as inputs and outputs to and from the mining algorithm, the data schema including input data schema and output data schema; and means for defining a data mining model dependent upon the data schema, wherein use of the means for defining a data mining model results in creation of a predefined data mining model;

wherein use of the said means for identifying a business problem, means for selecting a data mining algorithm, means for defining data schema, and means for defining a data mining model results in development of a domain-specific analytic application, the analytic application having:

at least one predefined data mining model;

a capability of production training the predefined data mining model using the historical data in the input data schema, wherein use of the capability of production training the predefined data mining model results in creation of a production trained data mining model; and a capability of production scoring production data by use of the production trained data mining model.

21. The system of claim 20 wherein the capability of production training the data mining model further comprises the capability of operating the data mining model in training mode using end user historical data in the input data schema.

22. The system of claim 20 wherein the capability of production scoring production data by use of the production trained data mining model further comprises the capability of applying the production trained data mining model to historical data stored in input schema.

23. The system of claim 20 wherein the capability of production scoring production data by use of the production trained data mining model further comprises the capability of applying the production trained data mining model to production data stared read from an end user's production database.

24. The system of claim 20 wherein the analytic application further comprises the capability of populating the input data schema with historical data.

25. The system of claim 24 wherein the capability of populating the input data schema with historical data further comprises the capabilities of extracting from historical data values of prediction data fields and writing the values of the prediction data fields into the input data schema for the data mining model.

26. The system of claim 20 wherein means for identifying a business problem to be solved further comprises means for identifying a business problem capable of expression through the use of referents that are defined in a specific computational domain.

27. The system of claim 20 wherein means for selecting a mining algorithm appropriate for solving the business problem further comprises means for selecting a radial basis function algorithm fbr value prediction.

28. The system of claim 20 wherein means for selecting a mining algorithm appropriate for solving the business problem further comprises means for selecting a neural value prediction algorithm.

29. The system of claim 20 wherein means for selecting a mining algorithm appropriate for solving the business problem further comprises means for selecting a demographic clustering algorithm.

30. The system of claim 20 wherein means for selecting a mining-algorithm appropriate for solving the business problem further comprises means for selecting a neural clustering algorithm.

31. The system of claim 20 wherein means for selecting a mining algorithm appropriate for solving the business problem further comprises means for selecting a tree classification algorithm.

32. The system of claim 20 wherein means for selecting a mining algorithm appropriate for solving the business problem further comprises means for selecting a neural classification algorithm.

33. The system of claim 20 wherein means for selecting a mining algorithm appropriate for solving the business problem further comprises means for selecting an associations algorithm.

34. The system of claim 20 wherein means for defining data schema for the mining algorithm further comprises:
means for selecting from historical data for inclusion in input data schema predictor fields capable of supporting the use of a data mining algorithm in predicting the value of a prediction field; and
means for selecting for inclusion in output data schema at least one prediction field.

35. The system of claim 20 wherein means for defining data schema for the mining algorithm further comprises means for selecting for inclusion in output, schema sufficient key fields to comprise a unique key for identification in production data of storage locations for the output data from the data mining algorithm.

36. The system of claim 20 wherein means for defining a data mining model based on the data schema further comprises means for establishing in a data structure comprising the data mining model definition values for fields defining the model.

37. The system of claim 36 wherein fields defining the model comprise:
a field representing the number of consecutive records to select from the input data schema to be used for training;
a field representing the number of consecutive records to select from the input data schema to be used for development scoring;
a field limiting the number of times the data mining model goes through its input data in training mode;
a field limiting the number of fitting centers created by the mining data mining algorithm at each pass through the input data;
a field indicating the inininium number of records to be assigned to a region;
a field identifying at least one predictor field; and
a field identifying a prediction field.

38. The system of claim 20 wherein means for defining a data mining model based on the data schema further comprises:
means for establishing in a data structure comprising the data mining model definition values for fields defining the model; and
means for development scoring historical data wherein test output data is created; and
means for testing the test output data for accuracy wherein an accuracy valuation is created;
wherein the means for establishing definition values, means for development scoring, and means for testing are capable of repeated use until the accuracy valuation meets a predetermined accuracy requirement.

39. A computer program product for developing a domain-specific analytic application having at least one predefined data mining model, the computer program product comprising:
a recording medium;
means, recorded on the recording medium, for identifying a business problem to be solved;
means, recorded on the recording medium, for selecting a data mining algorithm appropriate for solving the business problem;
means, recorded on the recording medium, for defining data schema for use as inputs and outputs to and from the mining algorithm, the data schema including input data schema and output data schema; and
means, recorded on the recording medium, for defining a data mining model dependent upon the data schema, wherein use of the means for defining a data mining model results in creation of a predefined data mining model;
wherein use of tue said means for identifying a business problem, means for selecting a data mining algorithm, means for defining data schema, and means for defining a data mining model results in development of a domain-specific analytic application, the analytic application having:
  at least one predetined data mining model;
  a capability of production training the predefined data mining model using the historical data in the input data schema, wherein use of the capability of production training the predefined data mining model results in creation of a production trained data mining model; and
  a capability of production scoring production data by use of the production trained data mining model.

40. The computer program product of claim 39 wherein the capability of production training the data mining model fiarther comprises the capability of operating the data mining model in training mode using end user historical data in the input data schema.

41. The computer program product of claim 39 wherein the capability of production scoring production data by use of the production trained data mining model further comprises the capability of applying the production trained data mining model to historical data stored in input schema.

42. The computer program product of claim 39 wherein the capability of production scoring production data by use of the production trained data mining model further comprises the capability of applying the production trained data mining model to production data stored read from an end user's production database.

43. The computer program product of claim 39 wherein the analytic application further comprises the capability of populating the input data schema with historical data.

44. The computer program product of claim 43 wherein the capability of populating the input data schema with historical data further comprises the capabilities of extracting from historical data values of prediction data fields and writing the values of the prediction data fields into the input data schema for the data mining model.

45. The computer program product of claim 39 wherein means for identifying a business problem ta be salved further comprises means, recorded on the recording medium, for identifying a business problem capable of expression through the use of referents that are defined in a specific computational domain.

46. The computer program product of claim 39 wherein means for selecting a mining algorithm appropriate for solving the business problem further comprises means, recorded on the recording medium, for selecting a radial basis function algorithm for value prediction.

47. The computer program product of claim 39 wherein means for selecting a mining algorithm appropriate for solving the business problem further comprises means, recorded on the recording medium, for selecting a neural value prediction algorithm.

48. The computer program product of claim 39 wherein means for selecting a mining algorithm appropriate for solving the business problem further comprises means, recorded on the recording medium, for selecting a demographic clustering algorithm.

49. The computer program product of claim 34 wherein means for selecting a mining algorithm appropriate for solving the business problem further comprises means, recorded on the recording medium, for selecting a neural clustering algorithm.

50. The computer program product of claim 39 wherein means for selecting a mining algorithm appropriate for solving the business problem further comprises means, recorded on the recording medium, for selecting a tree classification algorithm.

51. The computer program product of claim 39 wherein means for selecting a mining algorithm appropriate for solving the business problem further comprises means, recorded on the recording medium, for selecting a neural classification algorithm.

52. The computer program product of claim 39 wherein means for selecting a mining algorithm appropriate for solving the business problem further comprises means, recorded on the recording medium, for selecting an associations algorithm.

53. The computer program product of claim 39, wherein means for defining data schema for the mining algorithm further comprises:
  means, recorded on the recording medium, for selecting from historical data for inclusion in input data schema predictor fields capable of supporting the use of a data mining algorithm in predicting the value of a prediction field; and
  means, recorded on the recording medium, for selecting for inclusion in output data schema at least one prediction field.

54. The computer program product of claim 39 wherein means for defining data schema for the mining algorithm further comprises means, recorded on the recording medium, for selecting for inclusion in output schema sufficient key fields to comprise a unique key for identification in production data of storage locations for the output data from the data mining algorithm.

55. The computer program product of claim 39 wherein means for defining a data mining model based on the data schema further comprises means, recorded on the recording medium, for establishing in a data structure comprising the data mining model definition values for fields defining the model.

56. The computer program product of claim 55 wherein fields defining the model comprise:
  a field representing the number of consecutive records to select from the input data schema to be used for training;
  a field representing the number of consecutive records to select from the input data schema to be used for development scoring;
  a field limiting the number of times the data mining model goes through its input data in training mode;
  a field limiting the number of fitting centers created by the mining data mining algorithm at each pass through the input data;
  a field indicating the minimum number of records to be assigned to a region;
  a field identifying at least one predictor field; and
  a field identifying a prediction field.

57. The computer program product of claim 39 wherein means for defining a data mining model based on the data schema further comprises:
  means, recorded on the recording medium, for establishing in a data structure comprising the data mining model definition values for fields defining the model; and
  means, recorded on the recording medium, for development scaring historical data wherein test output data is created; and
  means, recorded on the recording medium, for testing the test output data for accuracy wherein an accuracy valuation is created;
  wherein the means for establishing definition values, memis for development scoring, and means for testing are capable of repeated use until the accuracy valuation meets a predetemilned accuracy requirement.

* * * * *

UNITED STATES PATENT AND TRADEMARK OFFICE
CERTIFICATE OF CORRECTION

PATENT NO. : 6,820,089 B2  Page 1 of 1
DATED : November 16, 2004
INVENTOR(S) : Prasad R. Vishnubhotla It is certified that error appears in the above-identified patent and that said Letters Patent is hereby corrected as shown below:

Column 20,
Line 26, delete "inininium" and insert -- minimum --.
Line 65, delete "tue" and insert -- the --.

Column 21,
Line 38, delete "ta" and insert -- to --; and delete "salved" and insert -- solved --.

Column 22,
Line 57, delete "scaring" and insert -- scoring --;
Line 63, delete "memis" and insert -- means --;
Line 65, delete "predetermilned" and insert -- predetermined --.

Signed and Sealed this

Nineteenth Day of April, 2005

JON W. DUDAS
*Director of the United States Patent and Trademark Office*